(12) United States Patent
Inouye et al.

(10) Patent No.: US 11,652,929 B2
(45) Date of Patent: *May 16, 2023

(54) METHODS AND SYSTEMS FOR ENABLING KIOSK MODE ON A MULTIFUNCTION DEVICE

(71) Applicant: Xerox Corporation, Norwalk, CT (US)

(72) Inventors: Steven Hiroshi Inouye, Cypress, CA (US); Bernard Roch Heroux, Jr., Webster, NY (US); David R. Beach, Fairport, NY (US); Donald A. Brown, Honeoye Falls, NY (US)

(73) Assignee: XEROX CORPORATION, Norwalk, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/645,185

(22) Filed: Dec. 20, 2021

(65) Prior Publication Data
US 2022/0116505 A1 Apr. 14, 2022

Related U.S. Application Data

(63) Continuation of application No. 16/995,996, filed on Aug. 18, 2020, now Pat. No. 11,218,601.
(Continued)

(51) Int. Cl.
*H04N 1/00* (2006.01)
*G06F 3/12* (2006.01)
*H04N 1/34* (2006.01)

(52) U.S. Cl.
CPC ....... *H04N 1/00143* (2013.01); *G06F 3/1204* (2013.01); *G06F 3/1238* (2013.01);
(Continued)

(58) Field of Classification Search
CPC .......... H04N 1/00143; H04N 1/00177; H04N 1/00307; H04N 1/00514; H04N 1/346; G06F 3/1204; G06F 3/1238
(Continued)

(56) References Cited

U.S. PATENT DOCUMENTS 7,839,521 B2 11/2010 Bard et al.
7,996,269 B2 8/2011 Inouye
(Continued)

FOREIGN PATENT DOCUMENTS

WO 2002048855 A1 6/2002

*Primary Examiner* — Neil R Mclean
(74) *Attorney, Agent, or Firm* — Fox Rothschild LLP

(57) ABSTRACT

Methods and systems for printing on a print device from both authorized users and guest users are disclosed. The methods include configuring the print device to execute document processing jobs from both authorized users and guest users based on a rule set. The method also includes receiving a request to initiate a document processing session on the print device, initiating the kiosk mode session for executing paid document processing jobs by outputting a kiosk mode user interface that is configured to allow the guest user to submit requests for paid document processing jobs, receiving a request for executing a document processing job via the kiosk mode user interface, causing the print device to execute the document processing job, and causing a payment processing service associated with the guest user to render payment for executing the document processing job.

20 Claims, 3 Drawing Sheets

Related U.S. Application Data

(60) Provisional application No. 63/002,698, filed on Mar. 31, 2020.

(52) U.S. Cl.
CPC ..... *H04N 1/00177* (2013.01); *H04N 1/00307* (2013.01); *H04N 1/00514* (2013.01); *H04N 1/346* (2013.01)

(58) Field of Classification Search
USPC ........................................................ 358/1.15
See application file for complete search history.

(56) References Cited

U.S. PATENT DOCUMENTS

| | | |
|---|---|---|
| 8,279,477 B2 | 10/2012 | Kohli et al. |
| 9,501,769 B2 | 11/2016 | Guerin et al. |
| 9,727,289 B2 | 8/2017 | Sugahara et al. |
| 10,198,225 B1 | 2/2019 | Joy et al. |
| 10,827,092 B1 | 11/2020 | Bier et al. |
| 2005/0206943 A1 | 9/2005 | Fukuda |
| 2014/0243709 A1 | 8/2014 | Gibson et al. |
| 2017/0230536 A1* | 8/2017 | Haapanen ............. G06F 3/1292 |
| 2020/0192617 A1* | 6/2020 | Otsuka ................. G06F 3/1258 |

* cited by examiner ered by reference. All sizes recited in this document are by way of example only, and the invention is not limited to structures having the specific sizes or dimension recited below. As used herein, the term "comprising" means "including, but not limited to."

METHODS AND SYSTEMS FOR ENABLING KIOSK MODE ON A MULTIFUNCTION DEVICE

CROSS-REFERENCE TO RELATED APPLICATION

This application is a continuation of and claims priority to U.S. patent application Ser. No. 16/995,996, filed Aug. 18, 2020, which claims priority to U.S. Provisional Patent Application No. 63/002,698, filed Mar. 31, 2020, the disclosures of which are incorporated herein by reference in their entirety.

BACKGROUND

Small businesses, home businesses, individuals, travelers and others have a need to print high quality documents from time to time. However, capital restrictions, printer availability or other issues can prevent them from buying or having access to the necessary equipment to prepare documents of the required quality or type. For example, a small business may prepare certain types of documents requiring special formatting or capabilities only on an irregular or intermittent basis. Purchasing a printing device capable of making such documents may not be cost effective for such a business. Similarly, with the ubiquity of portable electronic devices such as personal digital assistants, cellular telephones, and laptops, as well as increasing dependency on e-mail and other aspects of the internet, situations often arise in which a person will need to print or scan documents, photos, or the like while away from their typical work or home location. For example, a business traveler may need to print a presentation while out of the office, but may not have access to a printing device capable of preparing the presentation.

Some businesses have printing devices that can perform a variety of capabilities, but are not fully utilized. For example, a business may have a color printing device or some other printing device that it does not use to full capacity. As such, the business may have paid for a printing device that it is not fully utilizing and would like to identify ways to utilize the printing device more fully and/or to obtain additional revenue by using the printing device for additional purposes.

Print kiosks including a print device with point of sale (POS) payment solutions have been developed to allow the general public to pay for and receive a variety of document services provided by such printers. Such self-service multi-function printers are typically deployed in locations accessible to the general public. Currently, the POS payment solutions for these self-service multi-function printers require hardware for specific payment systems (e.g., processing machines for cash, including coins and banknotes; processing machines for checks; processing machines for various cards, including, but not limited to credit cards, debit cards, pre-paid cards, etc.). While such POS payment solutions are effective, the additional hardware required can be costly.

This document describes a system that may address at least some of the issues described above.

SUMMARY

This disclosure is not limited to the particular systems, methodologies or protocols described, as these may vary. The terminology used in this description is for the purpose of describing the particular versions or embodiments only, and is not intended to limit the scope.

As used in this document, the singular forms "a," "an," and "the" include plural reference unless the context clearly dictates otherwise. Unless defined otherwise, all technical and scientific terms used herein have the same meanings as commonly understood by one of ordinary skill in the art. All publications mentioned in this document are incorporated by reference. All sizes recited in this document are by way of example only, and the invention is not limited to structures having the specific sizes or dimension recited below. As used herein, the term "comprising" means "including, but not limited to."

In one or more scenarios, methods and systems for printing on a print device configured to execute document processing jobs from both authorized users and guest users are disclosed. The system may include a processor and a computer readable medium including programming instructions that are configured to cause the processor to execute the methods of this disclosure.

The methods may include, by a processor configuring the print device to execute document processing jobs from both authorized users and guest users based on a rule set. The methods may also include receiving a request to initiate a document processing session on the print device; initiating the kiosk mode session for executing paid document processing jobs by outputting a kiosk mode user interface that is configured to allow the guest user to submit requests for paid document processing jobs upon determining that the document processing session is a kiosk mode session for executing a document processing job for a guest user, receiving a request for executing a document processing job via the kiosk mode user interface, causing the print device to execute the document processing job, and causing a payment processing service associated with the guest user to render payment for executing the document processing job upon termination of the kiosk mode session. Optionally, the rule set may include one or more rules for determining when the print device is available for executing document processing jobs from guest users. Examples of such rules may include that the print device is available for executing document processing jobs from guest users after a threshold period of idle time of the print device, during non-peak demand times of the print device, during one or more time periods, based on a demand for paid document processing jobs at a location of the print device, and/or outside of business hours of an organization associated with the print device.

In various embodiments, the methods may also include determining whether the requested document processing session is the kiosk mode session for executing a document processing job for a guest user by determining whether a user associated with the request to initiate the document processing session is authorized to submit unpaid document processing jobs to the print device. Optionally, the determination of whether the user associated with the request to initiate the document processing session is authorized to submit unpaid document processing jobs to the print device may be based one, for example, login credentials of the user, device identifier associated with the request to initiate the document processing session, network information associated with the request to initiate the document processing session, and/or a token information associated with the request to initiate the document processing session.

In some embodiments, the request to initiate the document processing session may be received from a user interface associated with the print device. Optionally, the method may also include outputting a kiosk mode user interface at the print device upon initiation of the kiosk mode session. The kiosk mode user interface may be configured to allow the guest user to submit requests for paid document processing jobs.

In some other embodiments, the request to initiate the document processing session may be received from a mobile device. Optionally, the method may also include outputting a kiosk mode user interface at the mobile device upon initiation of the kiosk mode session, wherein the kiosk mode user interface is configured to allow the guest user to submit requests for paid document processing jobs.

In one or more embodiments, the method may include initiating the staff mode session for executing unpaid document processing jobs received from authorized users and prioritizing unpaid document processing jobs over paid document processing jobs in response to determining that the requested document processing session is the staff mode session. Optionally, the method may include outputting a staff mode user interface upon initiation of the staff mode session, wherein the staff mode user interface is configured to allow an authorized user to submit requests for unpaid document processing jobs.

Optionally, the method may include identifying a payment processing service associated with the user. In some other embodiments, the method may also include determining a cost for executing the document processing job at the print device.

In some embodiments, initiating the kiosk mode session for executing paid document processing jobs may include disabling one or more user interface components of the print device. Additionally and/or alternatively, initiating the kiosk mode session for executing paid document processing jobs may include paid document processing jobs over unpaid document processing jobs.

In some other scenarios, a print device may be configured to execute a method for executing document processing jobs from both authorized users and guest users. The method may include, by the print device receiving a first document processing session initiation request, determining whether the first document processing session initiation request is from a guest user or an authorized user, initiating a kiosk mode session for executing paid document processing jobs in response to determining that the first document processing session initiation request is from a guest user, processing a request from the guest user for executing a first document processing job, determining a cost for executing the first document processing job at the print device, receiving approval to execute the first document processing job at the print device for the determined cost from the guest user, executing the first document processing job, and, transmitting to a server a request to cause a payment processing service associated with the guest user to render payment that is equal to the determined cost upon termination of the kiosk mode session.

The method may also include receiving a second document processing initiation session request for processing a second document processing job upon termination of the kiosk mode session. Optionally, in response to determining that the second document processing session initiation request is from an authorized user, the method may include initiating a staff mode session for executing paid document processing jobs only, and executing the second document processing job without requiring the authorized user to provide a mode of payment. Alternatively and/or additionally, the method may include outputting a staff mode user interface upon initiation of the staff mode session, where the staff mode user interface is configured to allow the authorized user to submit requests for unpaid document processing jobs.

In some embodiments, determining whether the first document processing session initiation request is from a guest user or an authorized user may include determining whether a user associated with the first document processing session initiation request is authorized to submit unpaid document processing jobs to the print device.

The first document processing session initiation request may be received from a user interface associated with the print device and/or a mobile device. Optionally, the method may include outputting a kiosk mode user interface at the print device and/or the mobile device upon initiation of the kiosk mode session. The kiosk mode user interface may be configured to allow the guest user to submit requests for paid document processing jobs.

Optionally, the request to initiate the first document processing initiation session may be received from a mobile device upon establishment of a proximity enabled communications link between the print device and the mobile device.

DETAILED DESCRIPTION

Figure 1:
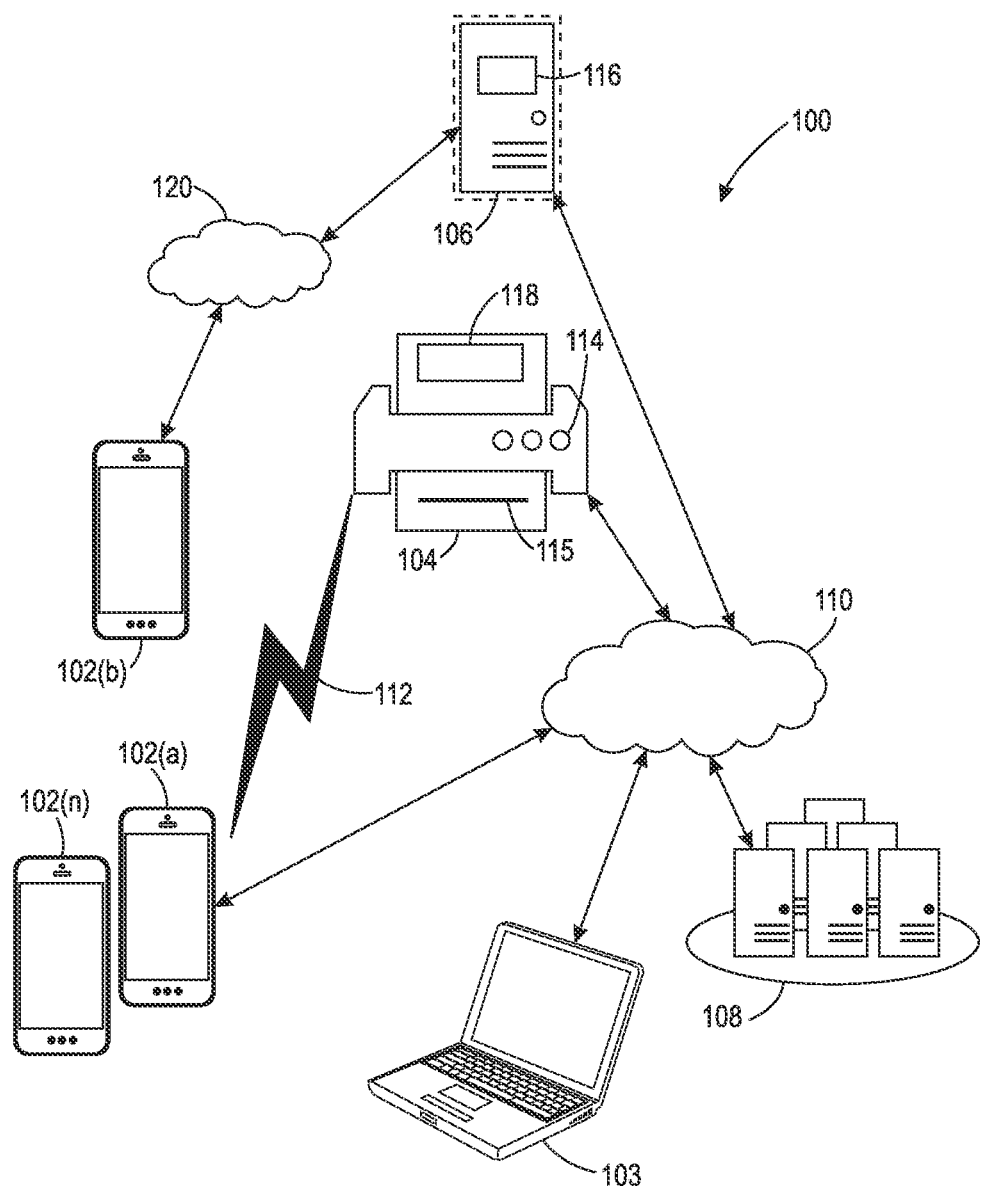
FIG. 1 illustrates an example system for enabling kiosk mode on a multifunction device according to an embodiment.

The following terms shall have, for purposes of this application, the respective meanings set forth below:

A "computing device" refers to a device that includes a processor and a non-transitory, computer-readable medium (i.e., memory). The memory may contain programming instructions that, when executed by the processor, cause the computing device to perform one or more operations according to the programming instructions. A computing device also may include additional components such as a touch-sensitive display device that serves as a user interface, as well as a camera or other image capturing device. A computing device may include one or more communication hardware components such as a transmitter and/or receiver that will enable the device to send and/or receive communications to and/or from other devices, whether via a communications network or via near-field or short-range communication protocols. As used in this description, a "computing device" may be a single device, or any number of devices having one or more processors that communicate with each other and share data and/or instructions. Examples of computing devices include, without limitation, mobile devices, smartphones, smart watches, digital cameras, tablet computing devices, electronic readers, personal computers, fitness tracking devices, wearable electronic devices, wearable electronic devices, media players, satellite navigation devices and the like.

A "mobile device" or "mobile electronic device" refers to a portable computing device. A mobile device may include a short range wireless communication interface such as a transmitter, a near field communication (NFC) or radio frequency identifier (RFID) tag or Bluetooth Low Energy (BLE) receiver (with reduced transmit power), a processor and non-transitory, computer-readable memory. The memory may contain programming instructions in the form of a software application that, when executed by the processor, cause the device to perform one or more document operations. Examples of suitable portable electronic devices include smartphones, personal digital assistants, cameras, tablet devices, electronic readers, personal computers, media players, satellite navigation devices and the like.

In this document, the term "application" refers to a set of programming instructions that, when executed by processor of a computing device or a print device, causes the computing device or the print device to perform some or all of functions that are described in this disclosure. A print device and/or a computing device may have an application preconfigured. Alternatively and/or additionally, a user of a print device and/or a computing device may download and install an application. A user may acquire an application by downloading it from an application database, a server, and/or from a print service provider. The application may include virtually any application type which may run on any underlying operating system or platform. The installed application may register itself with the device operating system allowing the application to monitor certain activities on the device operating system, and to use certain functionalities of the operating system. For example, the application may be automatically launched or initiated upon occurrence of an event. Furthermore, an application may correspond to a local application which executes on a computing device and/or a print device. Alternatively, an application may represent a web application which executes on a remote application server. That is, the application may include application functionality which is accessed by a user over a network and executed locally as an application, e.g., using a browser running on the electronic device and/or the print device. In other embodiments, an application may include or have access to both local and web (remote) elements. An application may include a database of information. In certain embodiments, the database may be exported to another local device or to a remote, cloud-based repository. Techniques for executing such an application, and related technology, are well known in the art and are therefore not described further in detail herein, except as may be helpful or necessary to understand operations of the A "document" refers to a digital representation of a document such as a word processor file, an electronic presentation file, an electronic spreadsheet, a PDF file, or a bitmap file (e.g. TIFF, JPG, PNG files etc.) that is stored in a computer readable memory or a storage medium. A document file may be an electronic representation of a physical document that contains one or multiple pages. A document may also refer to the set of instructions or metadata that cause the document to be processed.

A "document processing service" or "document processing job" refers to a service that can modify or otherwise process a document, for example, by performing print-related services, document repository services, scanning services, document management services, image processing services and/or the like.

The term "print device" refers to a machine having hardware capable of reading a digital document file and using the information from the file and associated print instructions to print of a physical document on a substrate. Components of a print device typically include a print engine, which includes print hardware such as a print head, which may include components such as a print cartridge containing ink, toner or another print material, as well as a document feeding system configured to pass a substrate through the print device so that the print head can print characters and/or images on the substrate. The print device may also include a wireless communication interface (such as a transmitter, an NFC interface, an RFID tag or a BLE receiver) used to communicate with one or more other devices. In some embodiments, a print device may have additional capabilities such as scanning or faxing and thus may be a multifunction device ("MFD").

A "kiosk mode" refers to a self-service mode on a print device for providing access to document processing services (e.g., printing, scanning, etc.) on the print device to a guest user (i.e., one who is not a registered or authorized user of the device or of a system or service to which the device is communicatively connected) in exchange for payment. It will be understood that a kiosk mode in accordance with the disclosure could be provided on a print device that is typically designated for dedicated document processing services to a service, group or organization. Configuring or enabling kiosk mode refers to operation of a print device to provide document processing services for unregistered guest users in exchange for payment.

A "staff mode" refers to a mode on a print device in which the print device provides document processing services to authorized users of the device or of a system or service to which the device is communicatively connected, such as staff of an organization that employs the print device.

This document will use the term "authorized user" to refer to users of a print device who are affiliated with the system or service to which the device is communicatively connected and thus are regular users of the device. The term "guest user" will refer to users who are not so affiliated, and who thus will be required to present a mode of payment before being permitted to use the print device. A "guest user" may be authorized by or registered with a cloud server (as will be described below), but is not affiliated with the print device's local system or service, and thus is not a regular user of the print device.

This document may refer to a print job processed for a guest user as a "paid" job, and to a print job processed for an authorized user as an "unpaid job." However, the characterization of a print job processed for an authorized user as an "unpaid job" does not necessarily mean that no payment is provided for such a job, as the authorized user's organization may have an account that pays for print jobs processed for many of the organization's users. However, an authorized user will not be first required to present a mode of payment (such as a credit card, debit card, or electronic payment account information) before being permitted to print a document at the print device.

A print device on a local network is often behind a firewall and cannot directly establish a connection with a device that is not connected to the local network and/or is unaware of the network settings of the print device for submission of print jobs. Therefore, it becomes challenging to accept document processing jobs from guest users (i.e., individuals who are not affiliated with the local network's organization) on such print devices even when a kiosk mode is enabled, without granting network access to other devices, submitting jobs through a device already connected to the print device, and/or changing various network configuration settings. The proposed solution enables kiosk mode on a print device that is typically designated for dedicated document processing services, in addition to facilitating submission by guest users of document processing jobs to the print device (via a cloud server) in exchange for payment. Furthermore, as discussed above, self-service multi-function print devices require hardware for specific payment systems which can be costly. Such payment solutions are also not always convenient for the user. For example, the guest user may have to wait for an available clerk or may not have the correct amount of cash required and/or may not have the correct type of credit, debit, or pre-paid card required. Finally, the proposed solution also enables a user to securely transmit payment for the document processing job to the print device owner without the need of additional hardware attached to the print device itself.

FIG. 1 illustrates an example system for configuring kiosk mode on print device. As shown in FIG. 1, the system 100 includes mobile electronic device(s) 102a, 102b . . . 102n, computing device(s) 103, at least one print device 104, a cloud server 106, and a payment service 108. The system 100 may be implemented in a distributed computing environment and interconnected by a communications network 110. For illustration purposes, the system 100 is shown as operating with only one print device. However, it should be understood that the system 100 can operate with any number of print devices, each with their own specific document processing functions and costs associated with those functions, and these print devices could be used by multiple different users.

The print device 104 may communicate with one or more components of the system 100 via a first communication network 110. A mobile device (e.g., 102b) that cannot directly communicate with the print device 104 via the first communication network 110, such as a device of a user who is not affiliated with the operator of the first communication network 110, may communicate with the print device 104 indirectly via the cloud server 106, using a second communications link 120. The first communication network 110 and the second communication network 120 may include connections such as, for example, wired connections, wireless communication links, or fiber optic cables, and may provide any suitable medium of communications such as WiFi, Bluetooth, Ethernet, cellular, intranet, and Internet.

Optionally, to enhance system security, communications between the various components of the system can be encrypted using any now or hereafter known encryption methods and systems.

In one or more embodiments, the computing device(s) 103 may be communicatively coupled to the print device 104 (e.g., wirelessly or a wired connection) for submission of document processing jobs by users who are affiliated with the network and thus permitted to print documents without any requirement to first presenting a method of payment (i.e., in a staff mode).

The cloud server 106 is configured to enable and manage kiosk mode on the print device 104, and/or route document processing jobs to print device 104 (if received from a mobile device), without establishing an actual or direct communicative connection between the mobile device and the print device 104. Cloud server 106 may be a server computer running software and connected to the network 110 and/or 120. For example, the cloud server 106 may be implemented on or as a web site, a server on a private network or local intranet, or other local or remote hardware, software, or logic.

The cloud server 106 may include a kiosk print service 116 that is configured to register a user and/or the print device 104 for enabling/managing a kiosk mode on the print device 104 for receipt and execution of paid document processing jobs that the cloud server 106 receives from guest users. The kiosk print service 116 may also be configured to communicate with applications on other devices such as applications on the print device 104, on the mobile device 102, on the payment service 108, and/or other applications on the cloud server 106 itself. Thus, for example, the kiosk print service 116 may implement various application programming interfaces (APIs) which enable such communication with other applications. The kiosk print service 116 may also host a website to allow a print device administrator to register a print device for kiosk mode; download a kiosk application on the print device; establish a kiosk account for the print device(s); establish various rules, policies, and settings for using a kiosk mode on print device; or the like.

In some embodiments, the cloud server 106 may also provide services such as formatting and rendering of documents. The cloud server 106 may optionally store information relating to users (and/or associated mobile devices) and the print devices in the system 100. For example, the cloud server 106 may include and/or may be in communication with a registration service (may or may not be a part of the kiosk print service 116) configured to receive a registration of the print device 104 and/or a user, and store information in a data store (not shown here) of registered print devices and/or users. Alternatively and/or additionally, the cloud server 106 may be configured to access and/or retrieve information associated with users and/or the print devices from a data store.

Information relating to the print device 104 may include, without limitation: a device identifier; network connection information; payment information (e.g., various costs associated with the document processing service(s) provided by the print device, acceptable payment methods, etc.); physical location of the print device, tax collection requirements for the jurisdiction in which the print device is located; contract terms relating to the print device (e.g., subscription, revenue share, or the like); times or rules for determining times when the print device is available for paid document processing jobs (e.g., after a certain threshold period of idle time, during non-peak demand times, outside of business hours, etc.); types and configuration settings available for different document processing jobs (e.g., color, double sided, font size, etc.); identification of users authorized to execute document processing jobs on the print device without payment information; associated with print device owner (s)/administrator(s) (e.g., login information, contact information, identification of other print devices owned, pricing tables, identification of associated users authorized by the owner/administrator to execute document processing jobs without payment, etc.), or the like.

Information relating to the users may include, without limitation: user authentication information (e.g., username, password, etc.); payment information from which cost for processing document processing jobs may be rendered (e.g., credit card, back account information, financial services information, etc.); usage history relating to one or more print devices in the system; whether or not the user or device is authorized to execute document processing jobs without payment; identification of mobile device(s) associated with the user; or the like.

The mobile electronic device(s) 102a-n are illustrated as an example of any mobile device which may store or have access to data which the user may desire to print and/or from which a user may wish to execute a document processing job in a kiosk mode and/or a staff mode. As shown in FIG. 1, the mobile device(s) 102a-n may execute a print application 112 configured for submitting document processing jobs to a print device in the system 100. The print application 112 may be installed on the mobile device(s) 102a-n at any time before a document processing job is submitted using the mobile device(s) 102a-n. Optionally, print application 112 may be a web application accessible by the mobile device(s) 102a-n. Upon installation and/or launch, the print application may store and/or may have access to payment information associated with a user of the mobile device. For example, the print application may prompt a user of the mobile device to provide the payment information.

A mobile device 102 may also communicatively connect to the print device 104 via a proximity enabled communications link 120. The proximity enabled communications link 120 may include, without limitation, NFC, BLE, and RFID. For example, in an embodiment, a proximity enabled communications link like NFC may be operable to initiate a direct or indirect network connection between an NFC-enabled device (e.g., mobile device 102) and a print device. For instance, an encoded NFC tag of a print device may respond to a field generated by another NFC-enabled device by providing information that identifies network information about the print device, such as a device identifier (e.g., IP address, MAC address, device serial number, device name, etc.), Bluetooth® address, and/or the like. In this regard, the print device NFC tag may transmit a print device identifier for receipt by, for example, the mobile device 102. The mobile device 102 may be configured to identify the print device identifier as being associated with a print device and to launch the print application 112 (or access a web hosted print application 112) that may begin a process of allowing the mobile device 102 to submit a document processing job to the print device 104 in staff mode or kiosk mode, as described below.

Near field communications are defined by a collection of standards for radio frequency communications that may be used when two devices are in close proximity. Protocols for implementation of near field communication may comply with industry standards, such as ISO/IEC 18092 or ISO/IEC 18000-3, published by the International Standards Organization. Typical ranges for near field communications are approximately 10 cm or less, although it may be 20 cm or less, 4 cm or less, or other ranges. Near field communications can support two-way (or peer-to-peer) communications between devices. In a passive mode, an NFC initiator device may output a carrier field that a target device (or transponder) uses to respond by modulating the provided field. In an active mode, the initiator and the target can each generate a carrier field, and the devices communicate by altering the fields. When utilizing two-way communications, two devices may exchange data to perform various functionalities that are enabled as a result of the near field communications.

Near field communications require close proximity (e.g., no more than a few inches, or in some cases no more than one or two feet) to establish a communications link, and hence the operation of establishing a link with another NFC device may be referred to as a "tap." The term "tap" as used herein does not necessarily refer to physical contact between communicating NFC devices, but rather positioning the NFC devices in sufficiently close proximity to establish an NFC communications link. Therefore, a user of an NFC enabled smart phone may tap an NFC tag to send and/or receive data from the tag. Near field communications offers several advantages over other wireless protocols and methods for encoding data to be read by a mobile terminal because of the short range nature of near field communications. Some examples include avoiding cross-talk from other nearby tags, managing access, improving security, and low power requirements. NFC tags may also be configured such that when read by the mobile terminal, cause the mobile terminal to perform certain processing actions, such as launching of applications, navigating to a particular website, or downloading of a particular file.

The mobile device 102 and/or the cloud server 106 can further communicate with a payment service 108 to allow a guest user to process payment for a paid document processing job. Specifically, the print application 112 and/or the kiosk print service 106 can allow the guest user to access the payment service 108 to effect payment for the specific paid use of the print device 104. The payment service 108 can comprise, for example, an e-commerce business, such as PayPal, that allows payments to be made through the Internet. Alternatively, the payment service 108 can comprise a credit card processing service or any other suitable payment service. In some embodiments, the payment service 108 may be included in the cloud server 106. In other embodiments, the payment service 108 may be external to the cloud server 106.

As shown in FIG. 1, the print device 104 may also execute a kiosk application 118 (local and/or web application) configured to enable kiosk mode on the print device 104 for allowing guest users to print paid document processing jobs on the print device 104. An administrator of a print device may register the print device for kiosk mode operation at any time using the kiosk application 118, such that the cloud sever 106 is notified that the print device is accepting paid document processing jobs (in addition to unpaid document processing jobs). Optionally, the administrator may define different rules relating to availability of kiosk mode on the print device 104. Examples of such rules may include, without limitation, defined time periods (e.g., certain days, certain hours during a day, etc.) when kiosk mode becomes automatically enabled without administrator action, enabling kiosk mode when the print device has been idle for a threshold period of time, enabling kiosk mode when there is increased demand in the location where the print device is located, enabling kiosk mode upon user request, historical usage of the print device at various times, or the like. Furthermore, an administrator may define policies relating to prioritization of paid versus unpaid jobs at the print device at any given time. For example, a policy may define time periods for executing either only paid document processing jobs or only unpaid document processing jobs, where such time periods may be fixed or determined based on above rules. Another policy may define time periods for executing paid document processing, but allow execution of unpaid document processing jobs when the print device is idle and/or does not have any queued paid document processing jobs. Another policy may define time periods for executing unpaid document processing, but allow execution of paid document processing jobs when the print device is idle and/or does not have any queued paid document processing jobs. Yet another policy may accept paid processing jobs at any time and prioritize execution of such paid jobs over execution of any unpaid jobs (or vice versa).

The kiosk application 118 may control the print device to operate in a staff mode or a kiosk mode, depending on the identity of a user initiating a document processing session (as described below). The print device 104 may include a user interface 114, which may be employed to select features and enter other data. Such a user interface may include, for example, a touch screen having touch activated keys for navigating through an option menu, a keypad, a graphical user interface (GUI), an audio interface, a display, or the like. The user interface 114 may be used to provide information to a user as well. The kiosk application 118 may also configure the user interface 114 to output a mode dependent interface depending on whether the print device is operating in a staff mode or a kiosk mode.

In an embodiment, the print device 104 may include a wireless communication interface (such as a transmitter, an NFC interface or tag, an RFID tag or a BLE beacon transmitter) used to communicate with one or more other devices (e.g., computing device 103, cloud server 106, and/or mobile device 102). For example, in order to enable a proximity enabled communications link 120, the print device 104 may include a tag 115 (e.g., an NFC tag, an RFID tag, etc.) that permits such communications with the mobile device 102. A tag 115 may be simply affixed to the print device 104 as a static tag or the tag may be integrated into the communications interface of the print device 104 as a dynamic tag that is powered by the print device 104. The tag 115 may include information to be transmitted to the mobile device 102 via the proximity enabled communications link 120. While the current disclosure describes NFC as an example to establish the proximity enabled communications link between a mobile device and a print device, it will be apparent to those skilled in the art that other short-range wireless communication protocols may also be used in accordance with the principles of the current disclosure.

In certain embodiments, the print device 104 may also include means for user authentication. The print device, for example, may be connected to an external user authentication system, such as a smart card reader, or may be configured to include internal user identification.

The print device 104 may also include signage (not shown here) including instructions for users for using the print device 104 for executing document processing jobs with or without payment requirements. The signage may also include instructions for a print device 104 administrator or owner for enabling kiosk mode on the print device 104.

Figure 2:
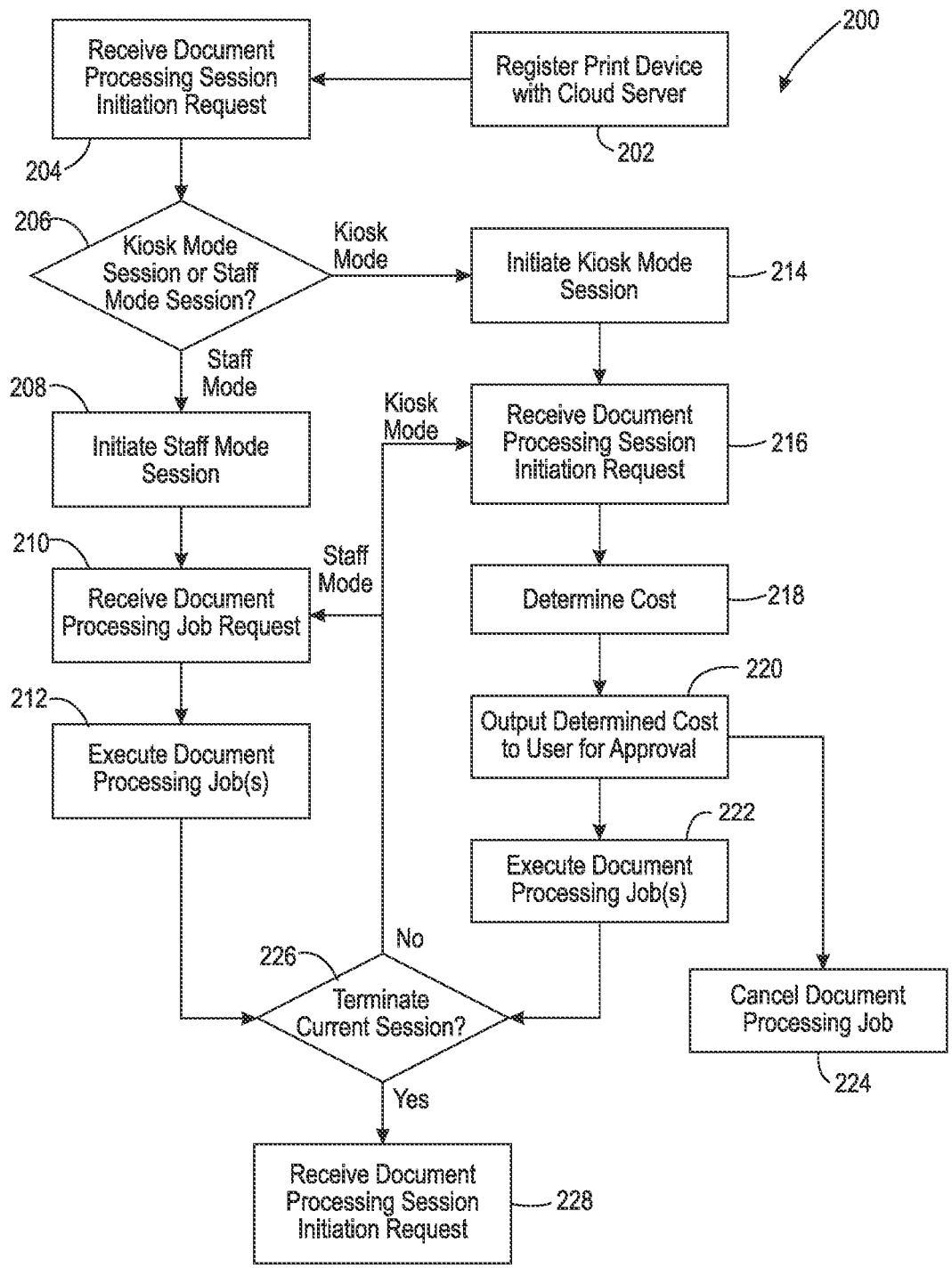
FIG. 2 is a flowchart illustrating an example method for enabling kiosk mode on a multifunction device according to an embodiment.

FIG. 2 is a flowchart illustrating and example method 200 for providing paid (kiosk mode) or unpaid (staff mode) document processing jobs to a print device. As discussed above, the print device executes a kiosk application for executing some or all the steps discussed below. Although the flowchart 200 of FIG. 2 illustrates the operations 202-228 in sequential order, it will be appreciated that this is merely an example, and that additional or alternative operations may be included. Further, operations of FIG. 2 and related operations may be executed in a different order than that shown, or in a parallel or overlapping fashion.

At 202, the kiosk application of the print device 104 may register the print device with the cloud server 106. The print device 104 may be configured to automatically request registration upon initial activation/installation of the kiosk application on the print device 104. Alternatively and/or additionally, a user of the print device 104 may manually request registration of the print device 104 via the kiosk application and/or a website hosted by the kiosk service 116 of the cloud server 106. In certain embodiments, the kiosk application may be installed on the print device 104 after registration of the print device 104.

During registration, the print device 104 may be associated with an account. Multiple print devices may be associated with the same account. In addition, a single print device may be associated with multiple accounts.

Registration of the print device 104 may include assigning a unique device identification (ID) to the print device 104. Examples of device IDs may include, without limitation, randomly generated alpha-numeric codes (e.g., ABN0896HJY), MAC address of the print device, a device serial number, IP address of the print device, print device name, machine-readable codes such as QR codes or barcodes, or the like. Registration may also include providing to the cloud server 106 information relating to the print device 104 such as, without limitation, different document processing services offered at the print device, print device capabilities, print device configurations and constraints, payment information associated with different document processing services (e.g., a function-cost menu, sales tax collection requirements, or the like), approved payment methods, time periods when paid document processing services are offered, maximum and minimum document processing job sizes, list of authorized users and/or devices who may use the print device without first being required to submit a payment mode (services available to such authorized users, rules of providing available for such authorized users, etc.), or the like.

At 204, the system may receive a document processing session initiation request from a user. The initiation request includes user information corresponding to the user that submits the request. Examples of user information may include, without limitation, login information (e.g., username, password), user email, user identification, guest user name or identification, payment information, device identifier corresponding to a device from which the initiation request is received where the device is associated with a particular user (e.g., MAC address, IP address, device name, certificate, or the like), network information associated with the user's device, or the like. The print device may receive the initiation request from a computing device, a mobile device (e.g., establishment of a proximity enabled communications link, by launching of a print application on the mobile device, etc.), and/or a user interface of the print device itself (i.e., walk-up request).

For submission of an initiation request from a mobile device, a proximity enabled communications link may be established between the mobile device and the print device (as discussed above), and a print device identifier may be transmitted to the mobile device. Optionally, a device identifier may be printed on the print device (e.g., a machine readable-code) and may be scanned by a user using a mobile device. It should also be noted that upon establishment of a proximity enabled communications link between the mobile device and the print device, the print application may be launched on the mobile device for execution of some of the steps described below.

At 206, the system may use the user information included in the initiation request to determine whether the requested document processing session will be executed in a kiosk mode (i.e., the session was submitted by a guest user) or a staff mode (i.e., the session was submitted by an authorized user). For example, the print device may analyze the user information (e.g., device identifier, username, login information, etc.) to determine whether it corresponds to a device or a user authorized to use the print device without first presenting a payment mode. For example, as discussed above, when the print device is registered with the cloud server, an administrator may define a list of authorized users and/or devices that are authorized to use the print device without first providing a payment mode, which may be used to determine whether the user information corresponds to a user on the list. In some embodiments, the system may identify a network or domain from which the request was received; if the request was received from a network or domain to which the print device is connected, the system may determine that the user is an authorized user (and if not the system may determine that the user is a guest user). In some embodiments, authorized users may have known print driver installed on their mobile device or other computing device, and the print driver may present a token or encode the print session request with an encoding that the system may use to identify the user as an authorized user; if the token or encoding is not presented, then the system may determine that the user is a guest user. If the system determines that the requested document processing session will be executed in a staff mode, it may initiate a staff mode document processing session on the print device (208). Initiating a staff mode document processing session on the print device may include configuring the print device to execute one or more document processing jobs received during the session, providing information like job restrictions and rules associated with unpaid document processing jobs, enumerate any previously submitted jobs that are queued for the print device, disable and/or queue paid document processing jobs, or the like. For example, when staff mode session is initiated, execution of paid jobs on the print device 104 may be restricted or prohibited by, for example, disabling walk-up initiation request interfaces, network restrictions, etc. In other embodiments, when a staff mode session is initiated, the print device 104 may put guest user document processing jobs in a queue for execution at a later time when a kiosk mode session is initiated.

During the staff mode document processing session, the system may output a staff mode user interface on the device from which the initiation request was received (i.e., the print device, the mobile device, etc.). The staff mode user interface may be a custom interface including various instructions, icons, tabs, or other user interface elements that guide a user through various steps for submission and execution of a non-guest document processing job (and/or associated information) at the print device. For example, the staff mode user interface may provide the user identification associated with the user authorized to execute document processing jobs, user role or title, types of document processing jobs available to the user (scan, FAX, print, etc.), print device capabilities available to the user (e.g., black and white, color, two-sided printing, etc.), requests for information for executing the document processing request (e.g., reason for submitting the document processing request, etc.), or the like.

The system may then receive one or more document processing jobs (210) via the staff mode user interface. Such document processing jobs may be previously queued jobs (e.g., received during a kiosk mode session) and/or new jobs. If the document processing job(s) is received at a mobile device or a computing device, it may be forwarded to the print device (directly if the device is on the same network as the print device and/or indirectly via the cloud server). For example, the mobile device may transmit the received print device identifier to the cloud server along with the document processing job(s). Optionally, a user may manually launch the print application on a mobile device and input the device identifier for transmission to the cloud server along with the job request. Alternatively and/or additionally, the user may scan or capture an image of the device identifier using, for example, a camera of a mobile device. If a proximity enabled communications link was established between the mobile device and the print device, the print application may automatically transmit the device identifier and the job request to the cloud server. The cloud server may identify the print device for the document processing job using the unique print device identifier, and transmit the document processing job to the identified print device.

The print device may execute the document processing job(s) (212) in accordance with the rules associated with the user (e.g., only allowed to print black and white, allowed to print in color, etc.) and/or job parameters received with the document processing job (e.g., double or one sided, print or black and white, font size and style, collated, punching instructions, etc.). If the request does not include job parameters for executing the document processing job, the print device may prompt a user to provide the parameters via the staff mode interface of the print device or another device from which the request was received. Optionally, the print device may determine the parameters (based on, for example, print device capabilities), or utilize pre-defined default parameters.

If the system determines that the requested document processing session is from a guest user and thus will be executed in a kiosk mode, it may initiate a kiosk mode document processing session on the print device (214). The print device may be configured to prohibit walk-up (guest) users from initiating a staff mode session. Initiating a kiosk mode document processing session on the print device may include configuring the print device to execute one or more document processing jobs received during the session only upon successful payment of associated costs, providing information like job restrictions and rules associated with paid document processing jobs, enumerate any previously submitted jobs that are queued for the print device, disable and/or queue unpaid document processing jobs, or the like. For example, when a kiosk mode session is initiated, execution of jobs on the print device 104 may be restricted or prohibited unless and until the user presents a mode of payment for the job. The kiosk mode user interface may direct the guest user to submit payment to the cloud server 106 via a web browser or dedicated application installed on the guest user's mobile device. The print device may then wait to receive confirmation from the cloud server 106 that the cloud server has received the guest user's payment mode, and the print device may not itself receive payment.

When in a kiosk mode, certain user interface components of the print device may be disabled, USB ports may be disabled, and other functions that are available to authorized users may be disabled. Similarly, when in a kiosk mode the print device 104 may be configured such that guest users (e.g., users of computing devices 103) can be restricted from submitting staff mode initiation requests to the print device 104 via, for example, a network restrict mechanism. In other embodiments, when kiosk mode enabled, the print device 104 may put all guest users' document processing jobs in a queue for execution at a later time after all staff mode session print jobs that are in the queue have completed. Alternatively, the print device may be configured to prioritize guest mode print jobs over staff mode print jobs, and it may hold staff mode print jobs in a queue (and optionally interrupt pending staff mode print jobs) until the guest mode print job has completed.

During the kiosk mode document processing session, the system may output a kiosk mode user interface on the device from which the initiation request was received (i.e., the print device, the mobile device, etc.). The kiosk mode user interface may be a custom interface including various instructions, icons, tabs, or other user interface elements that guide a user through various steps for submission and execution of a staff mode document processing job (and/or associated information) at the print device. For example, the kiosk mode user interface may provide the types of document processing jobs available to a user (scan, FAX, print, etc.), print device capabilities (e.g., black and white, color, two-sided printing, etc.), a list of available print device(s), various payment options available to a user, a cost menu for various types of jobs and job parameters, user interface for entering payment information, terms and services of a document processing contract, or the like.

The system may then receive one or more document processing jobs (216) via the kiosk mode user interface. Such document processing jobs may be previously queued jobs (e.g., received during a staff mode session) and/or new jobs. If the document processing job(s) is received at a mobile device or a computing device, it may be forwarded to the print device directly if the device is on the same network as the print device and/or indirectly via the cloud server. For example, the mobile device may transmit the received print device identifier to the cloud server along with the document processing job(s). The cloud server may identify the print device for the document processing job using the unique print device identifier, and transmit the document processing job to the identified print device. Optionally, a user may manually launch the print application on a mobile device and input the device identifier for transmission to the cloud server along with the job request. Alternatively and/or additionally, the user may scan or capture an image of the device identifier using, for example, a camera of a mobile device. If a proximity enabled communications link was established between the mobile device and the print device, the print application may automatically transmit the device identifier and the job request to the cloud server.

Optionally, the print device may be configured to default to a kiosk mode unless and until it receives a session initiation request from an authorized user, at which time it will switch to a staff mode. Alternatively, the print device may be configured to default to a staff mode unless and until it receives a session initiation request from a guest user, at which time it will switch to a kiosk mode.

At 218, the system (e.g., the cloud server, the print device, and/or the mobile device) may determine a cost associated with executing the document processing job in accordance with information (e.g., function cost menu, applicable taxes, contract terms, etc.) about the print device. In certain embodiments, the cost may also include fees charged by the cloud server for enabling the print functionality, payment service fees, etc. At 220, the system may output the determined cost to the user associated with the kiosk mode session for approval via, for example, a print device interface, a mobile device interface, or the like. In some embodiments, if the guest user has previously registered with the cloud server, the cloud server may automatically identify the mode of payment associated with the guest user (e.g., as provided by the guest user when installing the print application on the mobile device). However, if the system does not have information relating to a payment processing service associated with the guest user, the system may also prompt the user to provide a mode of payment such as, without limitation, a credit card account number, debit card account number, electronic payment account information, or the like. As noted above, the system also may determine a cost for jobs received from staff users, but if so in such cases the system will automatically charge the user's organization's account for the print job and will not require the authorized user to present a mode of payment.

If the user approves the determined cost, the print device may execute the document processing job(s) (222) in accordance with job parameters received with the document processing job (e.g., double or one sided, print or black and white, font size and style, collated, punching instructions, etc.) and/or rules associated with allowed job parameters in the kiosk mode. If the request does not include job parameters for executing the document processing job, the print device may prompt a user to provide the parameters via the kiosk mode interface of the print device or another device from which the request was received. Optionally, the print device may determine the parameters (based on, for example, print device capabilities), or utilize pre-defined default parameters. If the guest user does not approve the determined cost, the system may cancel the document processing job (224).

At 226, the system may determine if the current session (staff mode session or kiosk mode session) can be terminated. A session may be terminated upon receipt of user instructions to terminate a session, logging off of a user who initiated the session, disabling of a proximity enabled link between the print device and a mobile device that initiated the session, upon expiry of a certain time period, when no document processing request is received for a certain time period, or the like. If the current session cannot be terminated (226: NO), the print device may continue to receive execute document processing jobs as discussed above).

If the current session can be terminated (226: YES), the system may terminate the session and finalize a transaction by causing a payment processing service associated with the user to render the cost for executing the document processing job(s) (228) during the session. In some embodiments, communications relating to the payment processing may be encrypted or otherwise secured for security purposes, using any now or hereafter known methods. The cloud server may also transmit a proof of payment to the guest user. As discussed above, the cloud server may cause the print device to disable initiation of new sessions (kiosk mode of staff mode) until a current session is terminated.

In some embodiments, the cloud server may also appropriately format the job request such that it can be executed by the print device.

Figure 3:
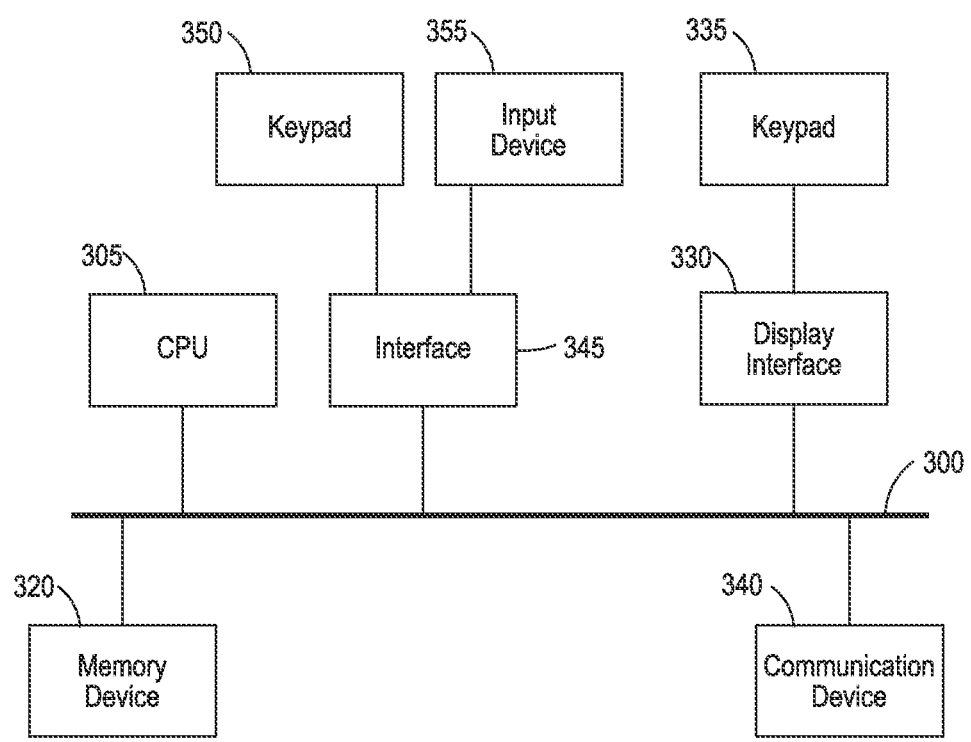
FIG. 3 illustrates a block diagram of example hardware that may be used to contain or implement program instructions according to an embodiment.

FIG. 3 depicts an example of internal hardware that may be included in any of the electronic components of the system, such as the mobile device, the print device, or the cloud server and/or hardware that may be used to contain or implement program instructions. A bus 300 serves as the main information highway interconnecting the other illustrated components of the hardware. CPU 305 is the central processing unit of the system, performing calculations and logic operations required to execute a program. CPU 305, alone or in conjunction with one or more of the other elements disclosed in FIG. 3, is an example of a processor as such term is used within this disclosure. Read only memory (ROM) and random access memory (RAM) constitute examples of non-transitory computer-readable storage media 320, memory devices or data stores as such terms are used within this disclosure.

Program instructions, software or interactive modules for providing the interface and performing any querying or analysis associated with one or more data sets may be stored in the memory device 320. Optionally, the program instructions may be stored on a tangible, non-transitory computer-readable medium such as a compact disk, a digital disk, flash memory, a memory card, a USB drive, an optical disc storage medium and/or other recording medium.

An optional display interface 330 may permit information from the bus 300 to be displayed on the display 335 in audio, visual, graphic or alphanumeric format. Communication with external devices may occur using various communication ports 340. A communication port 340 may be attached to a communications network, such as the Internet or an intranet.

The hardware may also include an interface 345 which allows for receipt of data from input devices such as a keypad 350 or other input device 355 such as a touch screen, a remote control, a pointing device, a video input device and/or an audio input device.

It will be appreciated that various of the above-disclosed and other features and functions, or alternatives thereof, may be desirably combined into many other different systems or applications or combinations of systems and applications. Also that various presently unforeseen or unanticipated alternatives, modifications, variations or improvements therein may be subsequently made by those skilled in the art which are also intended to be encompassed by the following claims.

What is claimed is:

1. A print system comprising:
   a processor; and
   a computer-readable storage medium comprising one or more programming instructions that, when executed, will cause the processor to:
      configure, based on a rule set, a print device to execute document processing jobs from both authorized users and guest users,
      receive a request to initiate a document processing session on the print device,
      in response to determining that the document processing session is a kiosk mode session for executing a document processing job for a guest user, initiate the kiosk mode session for executing paid document processing jobs by outputting a kiosk mode user interface that is configured to allow the guest user to submit requests for paid document processing jobs,
      receive, via the kiosk mode user interface, a request for executing a document processing job,
      cause the print device to execute the document processing job, and
      upon termination of the kiosk mode session, cause a payment processing service associated with the guest user to render payment for executing the document processing job.

2. The print system of claim 1, wherein the rule set comprises at least one of the following rules for determining when the print device is available for executing document processing jobs from guest users: after a threshold period of idle time of the print device; during non-peak demand times of the print device; during one or more time periods; based on a demand for paid document processing jobs at a location of the print device; or outside of business hours of an organization associated with the print device.

3. The print system of claim 1, further comprising programming instructions that cause the processor to determine whether the requested document processing session is the kiosk mode session by determining whether a user associated with the request to initiate the document processing session is authorized to submit unpaid document processing jobs to the print device.

4. The print system of claim 3, wherein the programming instructions that cause the processor to determine whether the user associated with the request to initiate the document processing session is authorized to submit unpaid document processing jobs to the print device comprise programming instructions to cause the processor to make the determination based on at least one of the following: login credentials of the user; device identifier associated with the request to initiate the document processing session; network information associated with the request to initiate the document processing session; or a token information associated with the request to initiate the document processing session.

5. The print system of claim 1, wherein the kiosk mode user interface is output on the print device.

6. The print system of claim 1, wherein the programming instructions that, when executed, will cause the processor to initiate the kiosk mode session for executing paid document processing jobs further comprise programming instructions that will cause the processor to disable one or more user interface components of the print device.

7. The print system of claim 1, wherein the programming instructions that, when executed, will cause the processor to initiate the kiosk mode session for executing paid document processing jobs further comprise programming instructions that will cause the processor to prioritize paid document processing jobs over unpaid document processing jobs.

8. The print system of claim 1, wherein the kiosk mode user interface is output on a mobile device of the guest user.

9. The print system of claim 1, further comprising programming instructions that, when executed, will cause the processor to identify the payment processing service associated with the guest user.

10. The print system of claim 1, further comprising programming instructions that, when executed, will cause the processor to determine a cost for executing the document processing job at the print device.

11. The print system of claim 1, further comprising programming instructions that, when executed, will cause the processor to:
    receive a second request to initiate a second document processing session on the print device; and
    in response to determining that the second document processing session is a staff mode session for executing a document processing job for an authorized user, initiate the staff mode session for executing unpaid document processing jobs received from authorized users and prioritizing unpaid document processing jobs over paid document processing jobs.

12. The print system of claim 11, further comprising programming instructions that, when executed, will cause the processor to output a staff mode user interface upon initiation of the staff mode session, wherein the staff mode user interface is configured to allow an authorized user to submit requests for unpaid document processing jobs.

13. A method for printing on a print device, the method comprising, by a processor:
    configuring, based on a rule set, the print device to execute document processing jobs from both authorized users and guest users;
    receiving a request to initiate a document processing session on the print device;
    in response to determining that the document processing session is a kiosk mode session for executing a document processing job for a guest user, initiating the kiosk mode session for executing paid document processing jobs by outputting a kiosk mode user interface that is configured to allow the guest user to submit requests for paid document processing jobs;
    receiving, via the kiosk mode user interface, a request for executing a document processing job;
    causing the print device to execute the document processing job; and upon termination of the kiosk mode session, causing a payment processing service associated with the guest user to render payment for executing the document processing job.

14. The method of claim 13, wherein the rule set comprises at least one of the following rules for determining when the print device is available for executing document processing jobs from guest users: after a threshold period of idle time of the print device; during non-peak demand times of the print device; during one or more time periods; based on a demand for paid document processing jobs at a location of the print device; or outside of business hours of an organization associated with the print device.

15. The method of claim 13, further comprising determining whether the requested document processing session is the kiosk mode session by determining whether a user associated with the request to initiate the document processing session is authorized to submit unpaid document processing jobs to the print device.

16. The method of claim 15, wherein determining whether the user associated with the request to initiate the document processing session is authorized to submit unpaid document processing jobs to the print device comprises making the determination based on at least one of the following: login credentials of the user; device identifier associated with the request to initiate the document processing session; network information associated with the request to initiate the document processing session; or a token information associated with the request to initiate the document processing session.

17. The method of claim 13, wherein the kiosk mode user interface is output on the print device or a mobile device of the guest user.

18. The method of claim 13, wherein initiating the kiosk mode session for executing paid document processing jobs further comprises disabling one or more user interface components of the print device.

19. The method of claim 13, wherein initiating the kiosk mode session for executing paid document processing jobs further comprises prioritizing paid document processing jobs over unpaid document processing jobs.

20. The method of claim 13, further comprising determining a cost for executing the document processing job at the print device.

* * * * *